United States Patent
Sawai (10) Patent No.: US 8,379,763 B2
(45) Date of Patent: Feb. 19, 2013

(54) WIRELESS COMMUNICATION DEVICE, WIRELESS COMMUNICATION METHOD, SIGNAL PROCESSING DEVICE, SIGNAL PROCESSING METHOD, AND COMPUTER PROGRAM

(75) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 746 days.

(21) Appl. No.: 12/565,336

(22) Filed: Sep. 23, 2009

(65) Prior Publication Data

US 2010/0111157 A1 May 6, 2010

(30) Foreign Application Priority Data

Oct. 31, 2008 (JP) .................................. 2008-281386

(51) Int. Cl.
*H04L 27/00* (2006.01)
*H04L 27/28* (2006.01)

(52) U.S. Cl. ........................................ 375/316; 375/260

(58) Field of Classification Search .................. 375/316, 375/260, 267, 130, 147, 149, 346; 370/350, 370/343, 465; 455/276.1, 226.1, 295
See application file for complete search history.

(56) References Cited

U.S. PATENT DOCUMENTS

| | | | |
|---|---|---|---|
| 6,618,454 B1 | 9/2003 | Agrawal et al. | |
| 6,862,440 B2 * | 3/2005 | Sampath | 455/276.1 |
| 8,077,696 B2 * | 12/2011 | Izumi et al. | 370/350 |

* cited by examiner

*Primary Examiner* — Khai Tran
(74) *Attorney, Agent, or Firm* — Oblon, Spivak, McClelland, Maier & Neustadt, L.L.P.

(57) ABSTRACT

A wireless communication device includes: a channel matrix estimating unit estimating a channel matrix including channel response elements between antennas; a phase error estimating unit estimating a phase error in a received signal on the basis of a decoding result of encoded and transmitted information symbols of a preamble of a received packet; and a waveform equalizing unit equalizing a waveform of data symbols of the received packet using the channel matrix. Original channel response elements are derived by removing an error of an estimated channel value due to the phase error estimated by the phase error estimating unit from the channel response elements of the channel matrix supplied from the channel matrix estimating unit, and the waveform equalizing unit equalizes the waveform of the data symbols using the channel matrix including the original channel response elements.

13 Claims, 6 Drawing Sheets

$$H' = \begin{bmatrix} (1+e^{j(\Delta)}) \cdot A_{00} \cdot e^{j\theta_{00}} + (1-e^{j(\Delta)})A_{01} \cdot e^{j\theta_{01}} \cdot x_1/x_0 & (1-e^{j(\Delta)})A_{00} \cdot e^{j\theta_{00}} \cdot x_0/x_1 + (1+e^{j(\Delta)}) \cdot A_{01} \cdot e^{j\theta_{01}} \\ (1+e^{j(\Delta)}) \cdot A_{10} \cdot e^{j\theta_{10}} + (1-e^{j(\Delta)})A_{11} \cdot e^{j\theta_{11}} \cdot x_1/x_0 & (1-e^{j(\Delta)})A_{10} \cdot e^{j\theta_{10}} \cdot x_0/x_1 + (1+e^{j(\Delta)}) \cdot A_{11} \cdot e^{j\theta_{11}} \end{bmatrix}$$

$$\underbrace{\begin{bmatrix} A_{00} \cdot e^{j\theta_{00}} & A_{01} \cdot e^{j\theta_{01}} \\ A_{10} \cdot e^{j\theta_{10}} & A_{11} \cdot e^{j\theta_{11}} \end{bmatrix}}_{H}$$

WIRELESS COMMUNICATION DEVICE, WIRELESS COMMUNICATION METHOD, SIGNAL PROCESSING DEVICE, SIGNAL PROCESSING METHOD, AND COMPUTER PROGRAM

BACKGROUND OF THE INVENTION

1. Field of the Invention

The present invention relates to a wireless communication device, a wireless communication method, a signal processing device, a signal processing method, and computer program, for performing a receiving operation in a wireless communication system including at least one transmitting antenna and at least one receiving antenna, and more particularly, to a wireless communication device, a wireless communication method, a signal processing device, a signal processing method, and a computer program, for estimating a channel using known information symbols added to the head of a packet.

2. Description of the Related Art

As systems released from the wiring of previous wired communication systems, wireless networks have attracted attention. Examples of a standard for wireless networks include IEEE (The Institute of Electrical and Electronics Engineers) 802.11 and IEEE 802.15. For example, in the IEEE 802.11a/g, an OFDM (Orthogonal Frequency Division Multiplexing) modulation system which is one of multi carrier systems is employed as a standard for a wireless LAN.

In the standard of IEEE 802.11a/g, a modulation system providing a communication speed of 54 Mbps as the maximum limit is supported. However, it is desired to obtain a next-generation wireless LAN standard capable of providing a higher bit rate. A MIMO (Multiple Input Multiple Output) communication attracts attention as a technique for providing an increase in the speed of wireless communications and an OFDM_MIMO communication system is employed in the standard of IEEE 802.11n, which is an extended standard of IEEE 802.11.

The MIMO system is a communication system in which plural antennas are provided to both a transmitter and a receiver so as to embody spatially-multiplexed streams. The transmitter multiplexes plural pieces of transmission data by spatially and temporally encoding the transmission data, distribute the multiplexed transmission data to plural transmitting antennas, and transmits the multiplexed transmission data to a channel. On the other hand, the receiver divides a reception signal into plural pieces of transmission data by spatially and temporally decoding the reception signal received by plural receiving antennas through the channel and thus acquires original data without any crosstalk between the streams. In this MIMO communication system, the frequency band is not widened and the transmission capacity is enhanced depending on the number of antennas, thereby improving communication speed. Since spatial multiplexing is employed, the frequency utilization efficiency is excellent. The MIMO system is a communication system using channel characteristics and is different from a simple transmitting and receiving adaptive array.

In MIMO communication, to spatially divide the spatially-multiplexed reception signal into the original stream signals, it is necessary to acquire a channel matrix H using any method and to calculate a reception weight matrix W used to perform a process of spatially multiplexing and spatially dividing plural streams from the channel matrix H using a predetermined algorithm.

The channel matrix H is acquired by allowing a transmitter and a receiver to transmit and receive a known training sequence, estimating a channel using the difference between the signal actually received and the known sequence, and arranging channel response elements of paths corresponding to combinations of the transmitting and receiving antennas in a matrix form. When the number of transmitting antennas is N and the number of receiving antennas is M, the channel matrix is an M×N (row×column) matrix. Therefore, when receiving N training sequences from the transmitter, the receiver can acquire the channel matrix H using the received training sequences.

An example of a relatively simple algorithm for acquiring the reception weight matrix W from the channel matrix H includes a zero force simply using the inverse matrix $H^{-1}$ of the channel matrix H as the reception weight matrix on the basis of the logic of completely removing the crosstalk or an MMSE (Minimum Means Square Error) receiving system for calculating the reception weight matrix W from the channel matrix H on the basis of the logic of maximizing the ratio of signal power and squared error (the sum of the crosstalk power and the noise power), that is, SNR. The MMSE is an algorithm intentionally generating the crosstalk and calculating the reception weight matrix W by introducing the concept of the noise power of the receiver. In an environment having great noise, it is known that the MMSE is much better than the zero force. In addition, it is also known that an MLD (Maximum Likelihood Detection) receiving system for estimating the maximum-likelihood transmission sequence by matching with all possible transmission signal sequence patterns is a receiving system having the highest performance. For example, there is disclosed a receiver for decoding multiplexed signals, which are obtained by combining spatial and temporal multiplexing communications using plural antennas for the OFDM modulation, in the MLD system (for example, see U.S. Pat. No. 6,618,454). The MMSE is classified into a waveform equalizing algorithm in a linear region and the MLD is classified into a waveform equalizing algorithm in a nonlinear region.

However, since various RF (Radio Frequency) circuits are incomplete in wireless communications, various error components may be applied to the received symbols. For example, a frequency offset is included in the received symbols due to a reference frequency drift between the oscillators of the transmitter and the receiver.

In a communication system employing the OFDM modulation system, a constant phase error component ($e^{j\Delta}$) is generated for every OFDM symbol for the frequency offset and the phase error component has an influence on the estimated channel value.

In general, a preamble including repeated known information symbols is added to the head of a packet. When detecting the preamble, the receiver precisely checks the receiving time and normalizes the reception signal power (sets the AGC gain), estimates and corrects the frequency offset, estimates the SNR (Signal to Noise Ratio), estimates the channel, and then demodulates data symbols. However, it is difficult to completely estimate the frequency offset value due to the influence of the noise and the like and the frequency offset component remains at the level of several hundred Hz even after the frequency offset is corrected.

The influence of the residual frequency offset appears as a phenomenon that all sub carriers of each OFDM symbol rotate uniformly depending on the phase error component ($e^{j\Delta}$). When the length of a packet increases, the phase error component ($e^{j\Delta}$) is accumulated and added to every symbol in the residual frequency offset. In a multi-value modulation mode, since a constellation point rotates periodically, it serves as a main factor of the decoding error, which degrades the communication quality.

For example, the residual values of the frequency offset can be estimated using a pilot tone included in a data symbol and the correction can be made by accumulating and adding the residual value in the unit of symbol or over the symbols (widely known).

When a general MIMO receiving algorithm such as an MMSE is used, sufficient decoding performance can be obtained by a countermeasure using the pilot tone. On the contrary, when an MIMO receiving algorithm such as the MLD receiving algorithm in which a great characteristic improvement is expected is employed, the influence of the phase error component due to the residual frequency offset on the estimated channel value appears as the deterioration in the characteristic of a non-negligible level, as has been acknowledged by the inventor.

SUMMARY OF THE INVENTION

Accordingly, it is desirable to provide a wireless communication device, a wireless communication method, a signal processing device, a signal processing method, and a computer program, which can suitably perform a receiving operation by estimating a channel using known information symbols added to the head of a packet in a wireless communication system including at least one antenna.

It is also desirable to provide a wireless communication device, a wireless communication method, a signal processing device, a signal processing method, and a computer program, which can prevent the deterioration in decoding characteristic due to a decreases in channel-estimating precision by suppressing the influence of a residual frequency offset after the frequency offset is initially corrected.

According to an embodiment of the invention, there is provided a wireless communication device for performing a receiving operation in a wireless communication system including at least one antenna. The wireless communication device includes: a channel matrix estimating unit estimating a channel matrix including channel response elements between antennas; a phase error estimating unit estimating a phase error resulting from a phase noise, a clock drift, and a frequency offset included in a received signal on the basis of a decoding result of encoded and transmitted information symbols of a preamble of a received packet; and a waveform equalizing unit equalizing a waveform of data symbols of the received packet using the channel matrix. Original channel response elements are derived by removing an error of an estimated channel value due to the phase error estimated by the phase error estimating unit from the channel response elements of the channel matrix supplied from the channel matrix estimating unit. The waveform equalizing unit equalizes the waveform of the data symbols using the channel matrix including the original channel response elements.

The wireless communication device may further include: a channel matrix acquiring unit acquiring a first channel matrix using known information symbols included in the preamble of the received packet; a modulation unit modulating the decoding result of the encoded and transmitted information symbols in the preamble of the received packet and generating replicas of transmission symbols; and a channel updating unit processing an error component of a fading variation component of the first channel matrix using the replica of the transmission symbols, the received symbols, and the first channel matrix acquired by the channel matrix acquiring unit and updating the first channel matrix to a second channel matrix. Here, the channel matrix estimating unit may determine the channel matrix to be supplied to the waveform equalizing unit on the basis of the first and second channel matrixes.

The wireless communication device may further include a modulation unit modulating the decoding result of the encoded and transmitted information symbols in the preamble of the received packet and generating replicas of transmission symbols, and the phase error estimating unit may estimate the phase error using the replicas of the transmission symbols, the received symbols, and the channel matrix.

The wireless communication device may be configured such that when the channel matrix estimating unit prepares and uses a channel matrix estimation result before acquiring the decoding result of the encoded and transmitted information symbols in the preamble of the received packet, the waveform equalizing unit may remove a phase error component estimated by the phase error estimating unit from the channel matrix estimated by the channel matrix estimating unit after acquiring the decoding result of the encoded and transmitted information symbols in the preamble of the received packet.

The wireless communication device may be configured such that when known information symbols are orthogonalized, arranged, and transmitted from an antenna and the channel matrix is divided into the channel response elements for use in the wireless communication device, the waveform equalizing unit may remove an interference component based on neighboring known information symbols in the signals received by a same antenna using the phase error estimated by the phase error estimating unit on the basis of the decoding result of the encoded and transmitted information symbols in the preamble of the received packet.

The wireless communication device may be configured such that when known information symbols are time-divisionally transmitted from an antenna, the waveform equalizing unit may remove the phase error component of subsequent known information symbols in the signals received by a same antenna using the phase error estimated by the phase error estimating unit on the basis of the decoding result of the encoded and transmitted information symbols in the preamble of the received packet.

The wireless communication device may be configured such that when known information symbols are frequency-divided into a plurality of sub carriers in a frequency axis and transmitted from an antenna, the wireless communication device may remove the phase error component of the sub carriers included in subsequent known information symbols in the signals received by a same antenna using the phase error estimated by the phase error estimating unit on the basis of the decoding result of the encoded and transmitted information symbols in the preamble of the received packet.

The wireless communication device may be configured such that when a transmission format in which known information symbols used for the channel matrix estimating unit to estimate the channel matrix are arranged before the encoded and transmitted information symbols in the preamble of the packet is applied, the phase error estimating unit may estimate a phase error component on the basis of the decoding result of the encoded and transmitted information symbols after the channel matrix estimating unit estimates the channel matrix including the error component, and the waveform equalizing unit may equalize the waveform of the symbols after removing the phase error component from the channel response elements of the channel matrix.

In the wireless communication device, the phase error estimating unit may average the phase errors estimated over several symbols.

According to another embodiment of the invention, there is provided a wireless communication method of performing a receiving operation in a wireless communication system including at least one antenna. The method includes the steps of: estimating a channel matrix including channel response elements between antennas; estimating a phase error resulting from a phase noise, a clock drift, and a frequency offset included in a received signal on the basis of a decoding result of encoded and transmitted information symbols in a preamble of a received packet; deriving original channel response elements by removing an error of an estimated channel value due to the estimated phase error from the channel response elements of the estimated channel matrix; and equalizing a waveform of data symbols using the channel matrix including the original channel response elements.

According to another embodiment of the invention, there is provided a signal processing device for processing a received signal in a wireless communication system including at least one antenna. The signal processing device includes: a channel matrix estimating unit estimating a channel matrix including channel response elements between antennas; a phase error estimating unit estimating a phase error resulting from a phase noise, a clock drift, and a frequency offset included in a received signal on the basis of a decoding result of encoded and transmitted information symbols in a preamble of a received packet; and a channel estimating precision improving unit deriving original channel response elements by removing an error of an estimated channel value due to the phase error estimated by the phase error estimating unit from the channel response elements of the channel matrix supplied from the channel matrix estimating unit.

According to another embodiment of the invention, there is provided a signal processing method of processing a received signal in a wireless communication system including at least one antenna. The method includes the steps of: estimating a channel matrix including channel response elements between antennas; estimating a phase error resulting from a phase noise, a clock drift, and a frequency offset included in a received signal on the basis of a decoding result of encoded and transmitted information symbols in a preamble of a received packet; and deriving original channel response elements by removing an error of an estimated channel value due to the estimated phase error from the channel response elements of the estimated channel matrix.

According to another embodiment of the invention, there is provided a computer-readable computer program causing a computer to carry out a process of allowing a wireless communication device to perform a receiving operation in a wireless communication system including at least one antenna. The computer program causes the computer to serve as: a channel matrix estimating unit estimating a channel matrix including channel response elements between antennas; a phase error estimating unit estimating a phase error resulting from a phase noise, a clock drift, and a frequency offset included in a received signal on the basis of a decoding result of encoded and transmitted information symbols in a preamble of a received packet; and a waveform equalizing unit equalizing a waveform of data symbols of the received packet using the channel matrix. Original channel response elements are derived by removing an error of an estimated channel value due to the phase error estimated by the phase error estimating unit from the channel response elements of the channel matrix supplied from the channel matrix estimating unit, and the waveform equalizing unit equalizes the waveform of the data symbols using the channel matrix including the original channel response elements.

The above-mentioned computer program defines a computer program which is described in a computer-readable manner so as to allow a computer to perform a predetermined process. In other words, by installing the computer program in the computer, a cooperative operation is carried out in the computer, thereby obtaining the same operational advantages as the above-mentioned wireless communication device.

According to the embodiments of the invention, it is possible to provide a wireless communication device, a wireless communication method, a signal processing device, a signal processing method, and a computer program, which can suitably perform a receiving operation by estimating a channel using known information symbols added to the head of a packet in a wireless communication system including at least one antenna.

According to the embodiments of the invention, it is also possible to provide a wireless communication device, a wireless communication method, a signal processing device, a signal processing method, and a computer program, which can prevent the deterioration in decoding characteristic due to a decrease in channel-estimating precision by suppressing the influence of a residual frequency offset after the frequency offset is initially corrected.

According to embodiments of the invention, in the wireless communication system including at least one antenna, the wireless communication device serving as a receiver can prevent the deterioration in decoding characteristic due to a decrease in channel-estimating precision due to the estimated errors by estimating the phase noise, the clock drift, or the frequency offset value to improve the correction precision using the decoding result of the encoded and transmitted information symbol portion at the time of estimating the channel using two or more known information symbols.

According to an embodiment of the invention, it is possible to improve the estimation precision of the channel matrix by estimating the fading variation component of the channel matrix using the replicas of the transmission symbols, the received symbols, and the estimated channel matrix and updating the error component of the variation component, for example, on the basis of the LMS algorithm.

According to an embodiment of the invention, it is possible to estimate the phase error component of the target symbols using replicas of the transmission symbols, the received symbols, and the estimated channel matrix and it is also possible to improve the estimation precision of the channel matrix by removing the phase error component from the channel response elements of the estimated channel matrix and squeezing out the phase error component.

According to an embodiment of the invention, when the channel estimation result is prepared and used before acquiring the decoding result of the encoded and transmitted information symbol portion, it is possible to prevent the deterioration in channel-estimating precision from being accumulated by removing the frequency offset component included in the estimated channel value after acquiring the decoding result of the encoded and transmitted information symbol portion.

According to an embodiment of the invention, in the method of transmitting channel responses from plural transmitting antennas, when the known information symbols are orthogonalized, arranged, and transmitted from the plural antennas and the receiver divides the transmitted known information symbols into the channel response elements from the transmitting antennas, the receiver can prevent the deterioration in channel-estimating precision from being accumulated by removing the interference component of the neighboring known information symbols in the signals received by a same receiving antenna using the frequency offset component acquired from the decoding result of the encoded and transmitted information symbol portion.

According to an embodiment of the invention, in the method of transmitting channel responses from plural transmitting antennas, when the known information symbols are time-divisionally transmitted from the plural antennas, the receiver can prevent the deterioration in channel-estimating precision from being accumulated by removing the phase error component of the subsequent known information symbol in the signals received by a same receiving antenna using the frequency offset component acquired from the decoding result of the encoded and transmitted information symbol portion.

According to an embodiment of the invention, in the method of transmitting channel responses from plural transmitting antennas, when the known information symbols are frequency-divisionally transmitted from the plural antennas, the receiver can prevent the deterioration in channel-estimating precision from being accumulated by removing the phase error component of the sub carriers included in the subsequent known information symbol in the signals received by a same receiving antenna using the frequency offset component acquired from the decoding result of the encoded and transmitted information symbol portion.

According to an embodiment of the invention, in the transmission format in which the known information symbols used to estimate the channel are arranged before the encoded and transmitted information symbol portion, the receiver estimates once the channel including the error components, decodes the encoded and transmitted information symbols, estimates the error component, removes the frequency offset component included in the estimated channel value, and then uses the resultant in the subsequent symbols, whereby it is possible to prevent the deterioration in channel-estimating precision from being accumulated.

According to an embodiment of the invention, when the receiver uses the decoding result of the encoded and transmitted information symbols, the receiver averages the estimated values of several symbols, improves the precision of the error component, removes the frequency offset component included in the estimated channel value, and then uses the resultant in the subsequent symbols, whereby it is possible to prevent the deterioration in channel-estimating precision from being accumulated.

Other goals, features, and advantages of the invention will become apparent from the following detailed description with reference to embodiments of the invention and the accompanying drawings.

DESCRIPTION OF THE PREFERRED EMBODIMENTS

Hereinafter, preferred embodiments of the invention will be described in detail with reference to the accompanying drawings.

The invention relates to a wireless communication device for performing a receiving operation in an MIMO communication system including at least one transmitting antenna and at least one receiving antenna. A reception weight matrix W necessary for equalizing received signals transmitted in the MIMO manner can be calculated from an estimated channel matrix H using an algorithm such as MMSE or MLD.

Due to the incompleteness of RF circuits, a frequency offset is included in the received signal. In general, a receiver estimates and corrects the frequency offset using known information symbols added to the head of a packet and additionally removes a residual frequency offset using a pilot tone in data symbols. A general MIMO receiving algorithm such as MMSE can be satisfactorily used as a countermeasure thereof. On the contrary, when an MIMO receiving algorithm such as an MLD receiving algorithm in which a great characteristic improvement is expected is employed, the error components appear as a deterioration in the characteristic of a non-negligible level, as has been acknowledged by the inventor.

An influence of the frequency offset on an estimated channel value will be first described.

Figure 1:
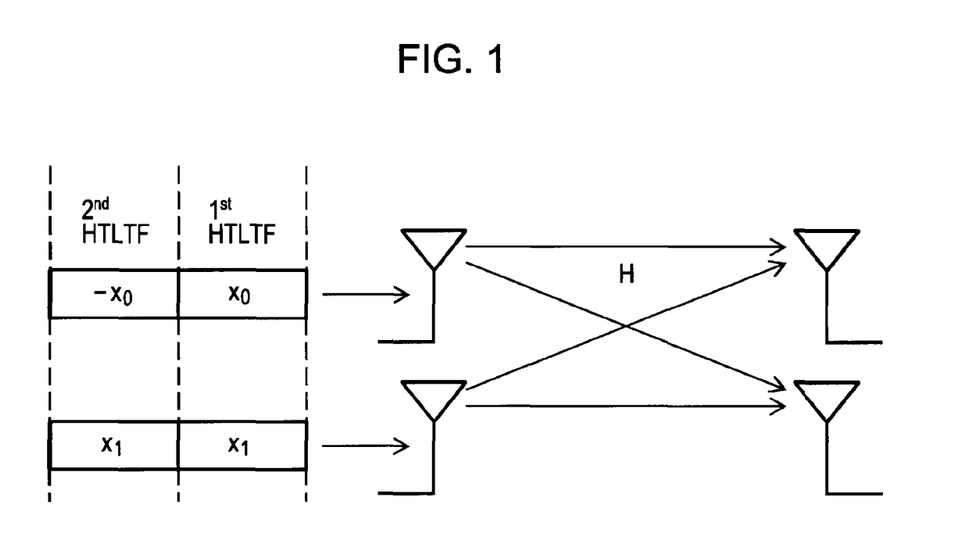
FIG. 1 is a diagram illustrating an example where a transmitter spatially multiplexes and transmits a training sequence including known information symbols from plural antennas and a receiver divides the transmitted training sequence to generate a channel matrix in a wireless communication system including two transmitting antennas and two receiving antennas (2×2).

FIG. 1 shows an example where a transmitter spatially multiplexes and transmits a training sequence including known information symbols from plural antennas and a receiver divides the transmitted training sequence to generate a channel matrix in a wireless communication system including two transmitting antennas and two receiving antennas (2×2). The transmitter can spatially multiplex plural transmission signals using an orthogonal matrix such as a Walsh matrix.

For example, in a wireless communication system defined in the standard of IEEE 802.11n, the transmitter orthogonalizes symbols and multiplexes and transmits a training sequence LTF (Long Training Sequence) from transmitting antenna 1 and transmitting antenna 2, whereby the difference in the reception power between the receiving branches of the receiver is prevented in order to reduce the receiving dynamic range. In the configuration of two transmitting antennas and two receiving antennas shown in FIG. 1, multiplexed training sequences of two OFDM symbols are transmitted.

When two data streams $X_0$ and $X_1$ are transmitted from the transmitting antennas, Expression 1 is obtained where the received signals through receiving antenna 1 and receiving antenna 2 of the receiver are $Y_{1stltf}$ and $Y_{2ndltf}$ respectively.

Expression 1

$$Y_{1st\,ltf} = \begin{bmatrix} A_{00} \cdot e^{j\theta_{00}} & A_{01} \cdot e^{j\theta_{01}} \\ A_{10} \cdot e^{j\theta_{10}} & A_{11} \cdot e^{j\theta_{11}} \end{bmatrix} \begin{bmatrix} x_0 \\ x_1 \end{bmatrix} \quad (1)$$

$$= \begin{bmatrix} A_{00} \cdot e^{j\theta_{00}} \cdot x_0 + A_{01} \cdot e^{j\theta_{01}} \cdot x_1 \\ A_{10} \cdot e^{j\theta_{10}} \cdot x_0 + A_{11} \cdot e^{j\theta_{11}} \cdot x_1 \end{bmatrix},$$

$$Y_{2nd\,ltf} \cdot e^{j\cdot\Delta\theta} = \begin{bmatrix} A_{00} \cdot e^{j(\theta_{00}+\Delta)} & A_{01} \cdot e^{j(\theta_{01}+\Delta)} \\ A_{10} \cdot e^{j(\theta_{10}+\Delta)} & A_{11} \cdot e^{j(\theta_{11}+\Delta)} \end{bmatrix} \begin{bmatrix} -x_0 \\ x_1 \end{bmatrix}$$

$$= \begin{bmatrix} -A_{00} \cdot e^{j(\theta_{00}+\Delta)} \cdot x_0 + A_{01} \cdot e^{j(\theta_{01}+\Delta)} \cdot x_1 \\ -A_{10} \cdot e^{j(\theta_{10}+\Delta)} \cdot x_0 + A_{11} \cdot e^{j(\theta_{11}+\Delta)} \cdot x_1 \end{bmatrix}$$

Therefore, the receiver acquires $Y_{1stltf}$ and $Y_{2ndltf}$ and can acquire the channel matrix H expressed by Expression 2 by adding and subtracting them.

Expression 2

$$H = \begin{bmatrix} A_{00} \cdot e^{j\theta_{00}} & A_{01} \cdot e^{j\theta_{01}} \\ A_{10} \cdot e^{j\theta_{10}} & A_{11} \cdot e^{j\theta_{11}} \end{bmatrix} \quad (2)$$

Figure 2:
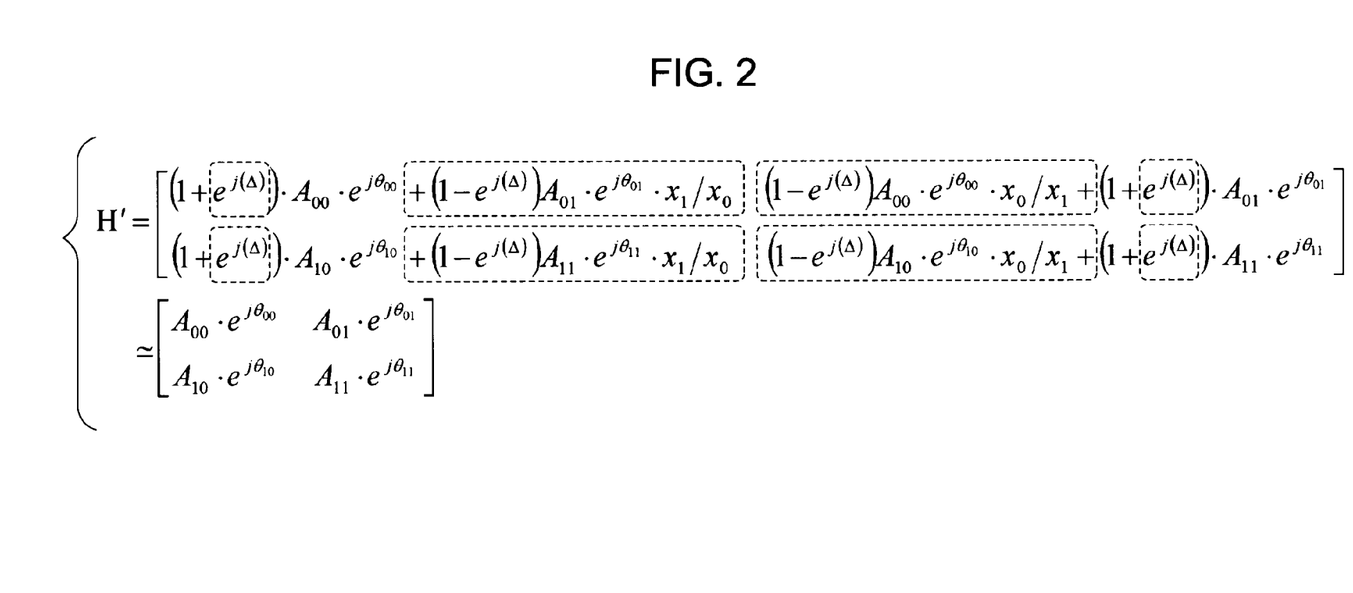
FIG. 2 is a diagram illustrating error components included in elements of a channel matrix H'.

However, actually, since the error components due to the frequency offset are not completely removed, a constant phase error component ($e^{j\Delta}$) occurs between the OFDM symbols, thereby causing an orthogonal breakdown. In this case, as expressed by Expression 3, the channel matrix H' including the error components is acquired. In FIG. 2, the error components included in the elements of the channel matrix H' expressed by Expression 3 are surrounded with a dotted frame.

Expression 3

$$H' = \begin{bmatrix} (1+e^{j(\Delta)}) \cdot A_{00} \cdot e^{j\theta_{00}} + & (1-e^{j(\Delta)})A_{00} \cdot e^{j\theta_{00}} \cdot \frac{x_0}{x_1} + \\ (1-e^{j(\Delta)})A_{01} \cdot e^{j\theta_{01}} \cdot \frac{x_1}{x_0} & (1+e^{j(\Delta)}) \cdot A_{01} \cdot e^{j\theta_{01}} \\ (1+e^{j(\Delta)}) \cdot A_{10} \cdot e^{j\theta_{10}} + & (1-e^{j(\Delta)})A_{10} \cdot e^{j\theta_{10}} \cdot \frac{x_0}{x_1} + \\ (1-e^{j(\Delta)})A_{11} \cdot e^{j\theta_{11}} \cdot \frac{x_1}{x_0} & (1+e^{j(\Delta)}) \cdot A_{11} \cdot e^{j\theta_{11}} \end{bmatrix} \quad (3)$$

$$\cong \begin{bmatrix} A_{00} \cdot e^{j\theta_{00}} & A_{01} \cdot e^{j\theta_{01}} \\ A_{10} \cdot e^{j\theta_{10}} & A_{11} \cdot e^{j\theta_{11}} \end{bmatrix}$$

The error components included in Expression 3 serve as an error of the channel estimating result, thereby degrading the decoding characteristic. In addition, Expression 4 is obtained by simplifying complex vectors in Expression 3 using a, b, c, d, and K, respectively.

Expression 4

$$H_\alpha = \begin{bmatrix} a+K \cdot c & c+K \cdot a \\ b+K \cdot d & d+K \cdot b \end{bmatrix}. \quad (4)$$

$$= \begin{bmatrix} a & c \\ b & d \end{bmatrix} + K \cdot \begin{bmatrix} c & a \\ d & b \end{bmatrix} \begin{bmatrix} x_1/x_0 \\ x_0/x_1 \end{bmatrix}$$

$$\cong \begin{bmatrix} a & c \\ b & d \end{bmatrix}$$

$$= P \cdot \begin{bmatrix} A_{00} \cdot e^{j(\theta_{00})} & A_{01} \cdot e^{j(\theta_{01})} \\ A_{10} \cdot e^{j(\theta_{10})} & A_{11} \cdot e^{j(\theta_{11})} \end{bmatrix}$$

$(K \cong 0)$,
$P = (1+e^{j\Delta}), K = (1-e^{j\Delta})$

When the phase error components ($e^{j\Delta}$) are sufficiently small, it can be seen that a channel matrix H without any error can be acquired from Expression 3 by ignoring the noise components. $x_1/x_0$ and $x_0/x_1$ in Expression 3 represent the difference in sign between the neighboring known information symbols modulated into binary values and are determined as 1 or −1 depending on an in-phase status or a reversed phase.

Figure 3:
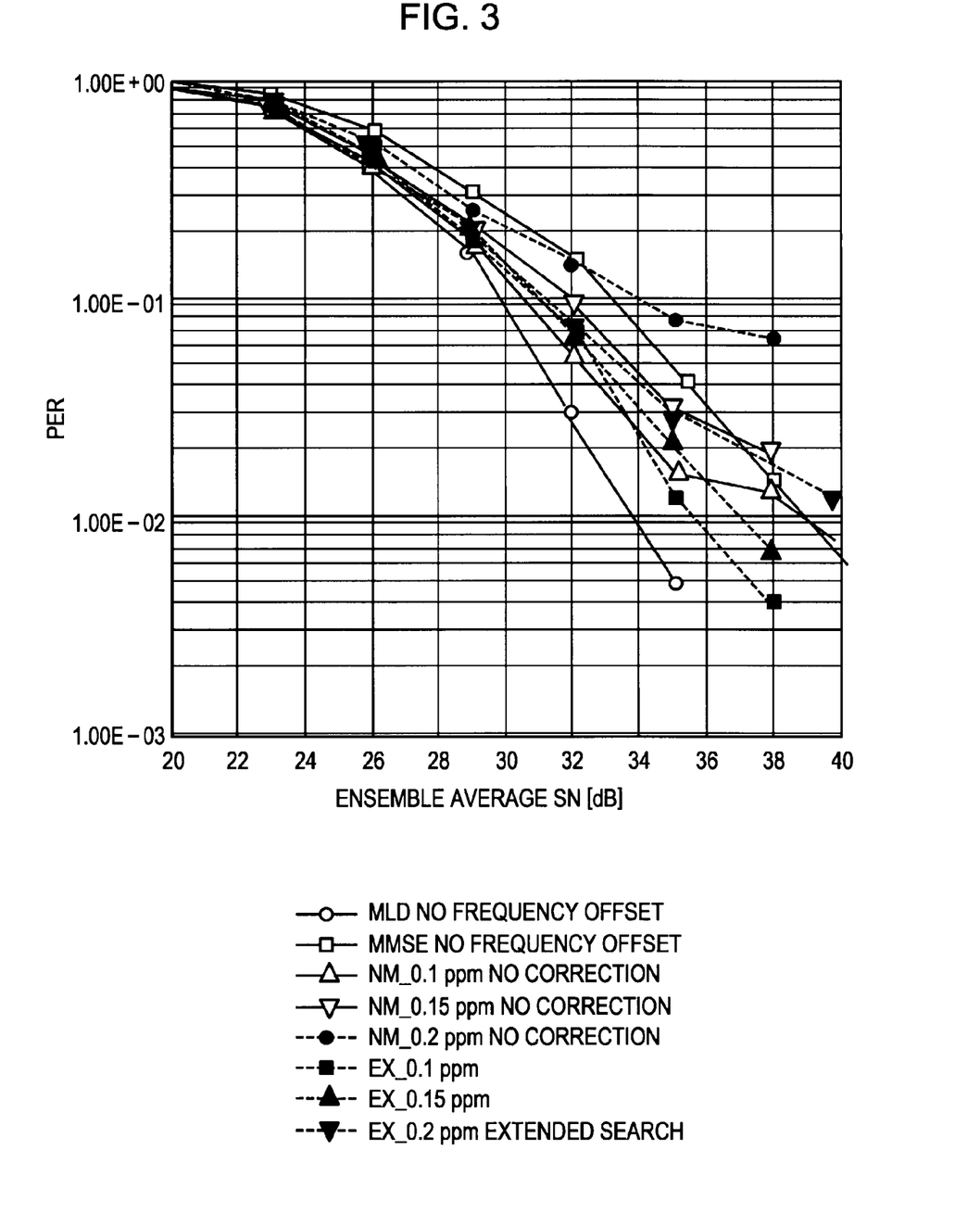
FIG. 3 is a diagram illustrating a simulation result of a characteristic deterioration due to a phase error component.

FIG. 3 shows the simulation result of the deterioration in characteristic expressed by Expression 3 or 4. In the simulation result, the frequency offset value by which it can be determined that the phase error component ($e^{j\Delta}$) is sufficiently small is shown, thereby clearly representing the influence of the error of the channel estimation result expressed by Expression 3. The simulation model is described as follows.

IEEE 802.11n channel model B
    1 OFDM symbol length
    MCS 14 (64 QAM×2 [stream])
    Frequency Offset (residual frequency offset value is assumed)
        0.1 [ppm]=525 Hz (rotation by about 0.756 degree per symbol)
        0.15 [ppm]=786 Hz (rotation by about 1.134 degree per symbol)
        0.2 [ppm]=1.05 kHz (rotation by about 1.512 degree per symbol)
    IEEE 802.11n phase noise model The simulation result shown in FIG. 3 shows that the influence of the error in the channel estimation result expressed by Expression 3 is very great even when the phase error of the data symbol portions can be completely estimated in the case where plural streams of 64 QAM (Quadrature Amplitude Modulation) are transmitted. When a phase error of 1 degree, at most, exists between the OFDM symbols to be estimated in the channel, it can be seen that the margin of the MLD reception characteristic relative to the MMSE reception characteristic may not be maintained (that is, the superiority of the MLD characteristic may not be maintained).

In the simulation shown in FIG. 3, the frequency offset value used as a model is a representative example of the error component (that is, the residual frequency offset component) after correcting the early frequency offset in the head of the preamble portion. Therefore, to suppress the deterioration of the reception characteristic, it is necessary to suppress the residual error component (that is, $e^{j(\Delta)}$ in Expression 3) as low as possible before performing the process using the channel matrix.

A method of improving channel estimating precision using a channel information updating loop in an MIMO receiver having plural receiving antennas will be described now.

Figure 4:
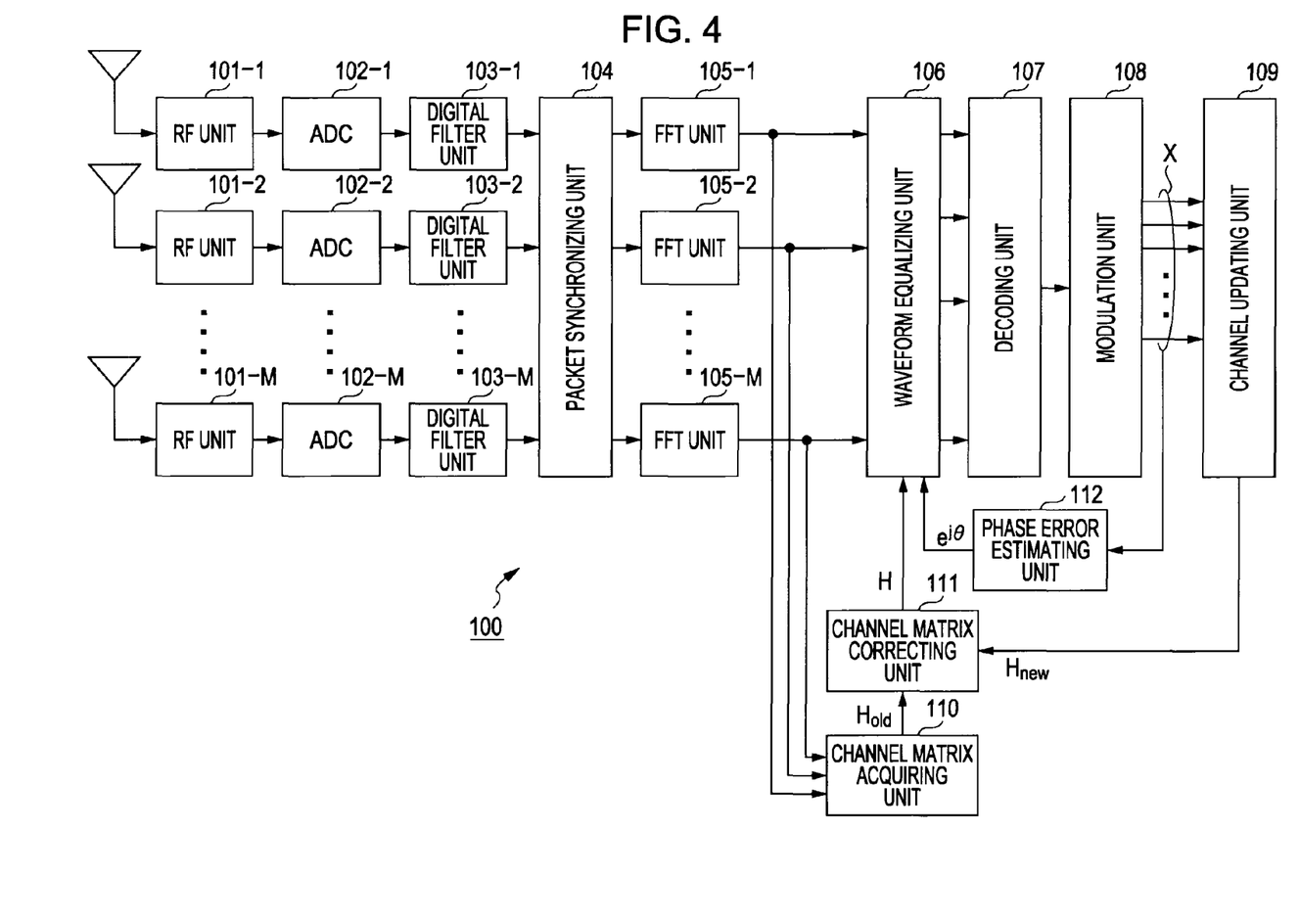
FIG. 4 is a block diagram illustrating the configuration of an MIMO receiver according to an embodiment of the invention.

FIG. 4 shows the configuration of an MIMO receiver according to an embodiment of the invention. The number of antennas (or the number of receiving branches) of the receiver 100 shown in the drawing is M, and M is 4 to the maximum limit when it is based on the IEEE standard. It is assumed that the receiver 100 described below receives packets acquired by beamforming and transmitting a stream from each transmitting branch.

Data reaching the receiving branches of the receiver 100 through a channel is subjected to an analog process by the RF (Radio Frequency) units 101 of the receiving antenna branches. The RF units 101 perform an amplification process using a low noise amplifier (LNA), a process of down-converting a reception signal in the RF frequency band, an AGC (Automatic Gain Control) process of normalizing the power of the reception signal to belong to the dynamic range of an AD converter (ADC) 102, a process of removing signal components departing from a desired band using an analog low-pass filter (LPF), and the like.

The reception signals of the receiving branches are subjected to an analog-to-digital conversion process by the ADC 102 and are then input into a digital filter 103, where the low-band component is removed.

A synchronization unit 104 detects coarse synchronization times by a self-correlation process in a section (described later) in which a relatively short training sequence (L-STS) is transmitted in burst in the front stage of the preamble and decides detailed synchronization times by a mutual correlation process in a section (L-LTF) in which a relatively long training sequence (L-LTS) is transmitted in burst in the rear stage of the preamble.

The synchronization unit 104 performs processes such as a process of estimating an early frequency offset, a process of estimating a noise level (or SNR), and an AGC process in the RF units 101, along with the detection of the synchronization times. For example, the frequency offset can be estimated by calculating the self-correction in the cycle of LTS in the L-LTF section and measuring the amount of rotating phase in each cycle of LTS. The SNR can be estimated by calculating the signal power and the noise power in the cycle of LTS in the L-LTF section after finding out a packet in the L-STF section.

The FFT unit 105 of each receiving branch removes a guard interval added to the head of the data transmitting section and performs a fast Fourier transform (FFT) on the reception signals in the time axis to transform the reception signals into signals in the frequency axis.

A waveform equalizing unit 106 equalizes the waveforms of the beamformed MIMO reception signals (data symbol portions of a packet). Specifically, the reception weight matrix W of the antennas is calculated on the basis of the channel matrix H estimated using the preamble portion of the received packet and the spatially-multiplexed signals are spatially decoded by multiplying reception vectors having received streams as elements by the antenna reception weight matrix W, whereby signal sequences independent by the streams are obtained.

A channel matrix acquiring unit 110 estimates the channel matrix H using the known information symbols included in the preamble of the received packet. A channel updating unit 109 updates the error components of the fading variation components of the channel matrix. A channel matrix correcting unit 111 determines the channel matrix H to be supplied to the waveform equalizing unit 106 on the basis of the channel matrixes $H_{old}$ and $H_{new}$ supplied from the channel matrix acquiring unit 110 and the channel updating unit 109. In this embodiment, the phase error estimating unit 112 estimates the phase error component resulting from the residual frequency offset on the basis of the decoding result of the encoded and transmitted information symbols in the preamble. The waveform equalizing unit 106 squeezes the residual frequency offset from the channel response elements of the channel matrix H on the basis of the phase error component. The details of the channel matrix estimating process will be described later.

As the method of calculating the antenna reception weight matrix W from the channel matrix H, an MMSE (Minimum Mean Square Error) algorithm, of calculating the reception weight matrix W from the channel matrix H on the basis of the logic of maximizing the ratio of the signal power and the squared error (the sum of the crosstalk power and the noise power), that is, the SNR, or an MLD (Maximum Likelihood Detection) algorithm of estimating the maximum-likelihood transmission sequence by matching with all possible transmission signal sequence patterns, can be used. However, it should be clearly understood that the characteristic of the MLD is not exhibited when the phase error component included in the channel matrix H due to the residual frequency offset is not squeezed out.

When demapping, deinterleaving, and depuncturing the received signals in the IQ signal space at a predetermined data rate, the decoding unit 107 combines plural received streams into one stream and outputs the combined stream. The data stream reproduced to the state before the transmission is sent to an upper-layer protocol processor not shown. The data processing does not relate directly to the invention, and thus its description is omitted.

On the other hand, the modulation unit 108 modulates the decoding result of the encoded symbol portion again, generates a replica of the transmission symbol X from the received symbol Y, and supplies the generated replica to the channel updating unit 109. The channel updating unit 109 updates the channel matrix using the replica of the transmission symbol X and supplies the updated channel matrix to the channel matrix correcting unit 111.

The blocks for performing the digital signal processing are controlled by a time base controller (TBC) not shown, and the time to start the process, the time to end the process, or the parameters necessary for the process are input to the blocks from the TBC in time.

Figure 5:
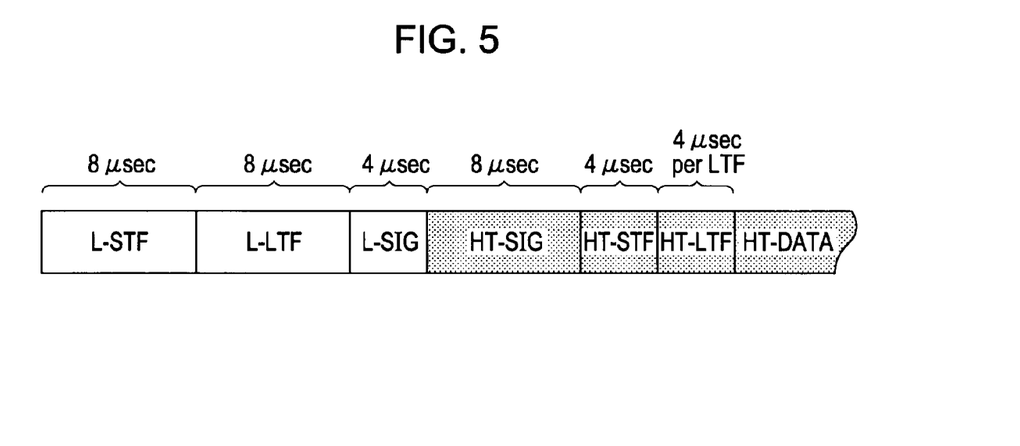
FIG. 5 is a diagram illustrating the packet structure of a mixed format defined in the standard of IEEE 802.11n.

FIG. 5 shows a mixed format defined in the standard of IEEE 802.11n as an example of a packet structure received by the receiver shown in FIG. 4.

The header portion includes an L-STF (Legacy Short Training Field) in which short known information symbols STS (Short Training Sequence) are transmitted in burst, an L-LTF (Legacy Long Training Field) in which long known information symbols LTS (Long Training Sequence) are transmitted in burst, and an L-SIG (Legacy SIGnal Field) in which the transmission rate or the data length is described and a preamble (hereinafter, also referred to as "HT preamble") having a format (hereinafter, also referred to as "HT format") specific to the standard of IEEE 802.11n and a data portion are subsequent thereto.

The applications of the preamble are not particularly defined. However, a general receiver performs the setting of a gain of the receiver or the correcting of the DC offset using four STS symbols of 0.8 microseconds and performs the estimating and correcting of the frequency offset, the detecting of a packet, and the detecting of the coarse time using the other six STS symbols.

The HT preamble includes HT-SIG, HT-STF, and HT-LTF. The control information necessary for analyzing the transmission mode (MCS) applied to PHY payloads (PSDU: PLCP (Physical Layer Convergence Procedure) Service Data Unit) or the HT format of the data lengths of the payloads is described in the HT-SIG. The HT-STF includes training symbols for improving the AGC (Automatic Gain Control) in the MIMO system. The HT-LTF includes training symbols for calculating the channel matrix by estimating the channel of each input signal spatially modulated (mapped) by the receiver.

In MIMO communication using two or more transmitting branches, the receiver estimates the channel of respective receiving antennas by which the received signals are spatially divided to acquire the channel matrix. Accordingly, the transmitter transmits the HT-LTF from the transmitting antennas in a time-division manner. Therefore, one or more HT-LTF fields are added depending on the number of spatial streams.

The frequency offset value using the simulation model shown in FIG. 3 shows the influence of the error component resulting from the residual frequency after the early frequency offset is corrected in the head preamble L-LTF. To suppress the deterioration in reception characteristic, it is necessary to suppress the residual error component ($e^{j\theta}$) as much as possible before performing the process using the channel matrix H.

In the receiver 100 shown in FIG. 4, the channel updating unit 109 updates the channel matrix according to Expression 5 using the replica of the transmission symbol X generated by modulating the decoding result of the encoded symbol portion again, the received symbol Y, and the channel matrix H acquired by the channel matrix acquiring unit 110 on the basis of the LMS (Least Mean Square) algorithm. In the expression, μ represents the forgetting factor. The superscript H of the matrix represents a complex conjugate transposed matrix.

Expression 5

$$H_{new} = H_{old} + \mu \cdot (Y - H_{old} \cdot \hat{X}) \cdot \hat{X}^H, 0 < \mu \leq 1.0 \quad (5)$$

The channel updating unit 109 sends the channel matrix $H_{new}$ updated using the replica of the transmission symbol X to the channel matrix correcting unit 111. The channel matrix correcting unit 111 can update the error components of the fading variation components in the channel matrix by estimating the variation components on the basis of the approximating calculation expressed by Expression 5.

When a general MIMO receiving algorithm such as the MMSE algorithm is used, it is considered that sufficient decoding performance can be obtained by the countermeasure using the channel information updating loop of updating the error components of the fading variation components in the channel matrix. On the contrary, when the MIMO receiving algorithm such as the MLD receiving algorithm of which the great improvement in characteristic is expected is used, the influence of the phase error component on the estimated channel value due to the residual frequency offset may appear as the deterioration in characteristic of a non-negligible level.

Therefore, the receiver 100 according to this embodiment employs the above-mentioned channel information updating loop and additionally squeezes out the residual offset component. Specifically, when the decoding result of the encoded symbol portion in the decoding unit 107 is modulated again by the modulation unit 108 to generate the replica of the transmission symbol X, the phase error estimating unit 112 estimates the phase error component Δθ [rad] between the neighboring symbols by Expression 6 (where it is assumed that the channel variation due to fading is sufficiently less than the symbol length). Then, the waveform equalizing unit 106 squeezes the channel matrix elements of the channel matrix supplied from the channel matrix correcting unit 111 using the phase error component Δθ.

Expression 6

$$\Delta\theta = \left( \angle \left( \frac{\sum_{i=0}^{i<N} \left( \left( \sum_{k=0}^{k<M} (Y_{i,k} - H \cdot \hat{X}_{i,k}) \right) \right)}{\sum_{i=0}^{i<N} (i+1)} \right) \right) [\text{rad}] \quad (6)$$

In Expression 6, N represents the number of symbols used for the estimation, M represents the number of receiving branches of the receiver 100, Y represents the received signal, and Δ represents the weighted average value of the phase error estimation results between the symbols due to the frequency offset error. A weighted-averaging method depending on the magnitudes of error vectors or a method of averaging rotation angles instead of vectors may be employed.

Figure 6:
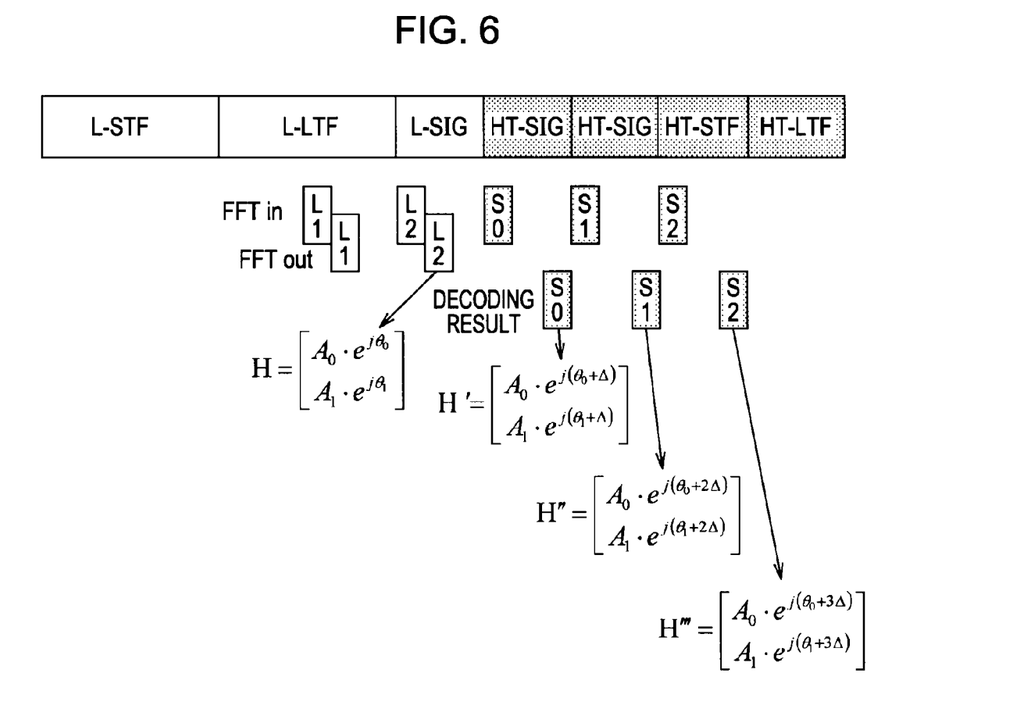
FIG. 6 is a diagram illustrating the structure for correcting a residual frequency offset using an SIG portion in an MF packet according to the standard of IEEE 802.11n.

FIG. 6 shows the structure for correcting the residual frequency offset using the SIG unit in the MF packet (see the above description and FIG. 5) according to the standard of IEEE 802.11n.

Two known information symbols L1 and L2 of the L-LTF field are transmitted in burst to be orthogonal to each other from two antennas of the transmitter, one information symbol S0 of the L-SIG field and two information symbols S1 and S2 of the H-SIG field are subsequently encoded and transmitted, and the known information symbol HT-STF used to improve the AGC and the known information symbol HT-LTF used to calculate the channel matrix are then transmitted.

The early estimation of the frequency offset in the time domain is ended in the L-LTF, three information symbols of one L-SIG and two HT-SIG are then encoded and transmitted, and the known sequence HT-LTF for estimating the channel matrix is then transmitted. When the phase error generated between the neighboring symbols is Δ, the residual frequency offset of 3Δ is accumulated in the received symbols until the channel estimation is started after the frequency offset is corrected early. When the residual frequency offset is not corrected until the HT-LTF is received after the L-LTF is received, the MIMO waveform equalizing process is performed using the channel matrix H''' including the phase error component corresponding to the residual frequency offset 3Δ, thereby degrading the decoding characteristic.

On the contrary, when the channel estimation result is prepared using the L-LTF including two orthogonalized known information symbols and the decoding result of the encoded and transmitted information symbols L-SIG and HT-SIG can be acquired in time before the channel matrix H is used, the frequency offset is corrected by the packet synchronization unit 104 (in other words, in the time domain) before the HT-LTF so as to suppress K in Expression 3 as small as possible, thereby improving channel-estimating precision. (In the shown example, three encoded and transmitted information symbols totaling one L-SIG and two HT-SIG exist as the symbols before the process of the HT-LTF which is a symbol for decoding the MIMO signal, that is, for estimating the channel, whereby the number of symbols N used in the estimation using Expression 6 is 3.)

Therefore, in the receiver 100 according to this embodiment, when the channel matrix acquiring unit 110 prepares and uses the channel estimation result $H_{old}$ using the known information symbol L-LTF before the decoding unit 107 acquires the decoding result of the encoded and transmitted information symbols L-SIG and HT-SIG, the phase error estimating unit 112 estimates the phase error $e^{j\theta}$ generated between the target symbols and the waveform equalizing unit 106 removes the estimated error component due to the phase error from the channel matrix H (in which the error component of the fading variation component has been updated) after the decoding unit 107 acquires the decoding result of the encoded and transmitted information symbols L-SIG and HT-SIG, thereby preventing the deterioration in channel-estimating precision from being accumulated.

When Δ→K is acquired in the order expressed by Expression 6 by the phase error estimating unit 112, the acquired Δ→K is supplied to the waveform equalizing unit 106. The waveform equalizing unit 106 removes the error of the estimated channel value due to the phase error from the channel response elements h0, h1, h2, and h3 of the channel matrix H sent from the channel matrix correcting unit 111 according to Expression 7, thereby deriving the original channel response elements a, b, c, and d. Here, L in Expression 7 represents the difference in sign between the first and second symbol training information ($x_0$ and $x_1$ in Expression 3).

Expression 7

$$H = \begin{bmatrix} a & c \\ b & d \end{bmatrix}, H_\alpha = \begin{bmatrix} h0 & h1 \\ h2 & h3 \end{bmatrix} \quad (7)$$

$$h0 = a + K \cdot c \cdot L \Rightarrow a = h0 - K \cdot c \cdot L$$
$$h1 = c + K \cdot a \cdot L \Rightarrow c - K \cdot (h0 - K \cdot c \cdot L) \cdot L - h1 = 0,$$
$$(1 + K^2) \cdot c - K \cdot h0 \cdot L - h1 = 0, (L^2 = 1)$$
$$c = \frac{(K \cdot h0 \cdot L + h1)}{(1 + K^2)}$$

The following expressions are obtained in the same way.

$$a = \frac{(h0 - K \cdot h1 \cdot L)}{(1 + K^2)},$$
$$b = \frac{(h2 - K \cdot h3 \cdot L)}{(1 + K^2)},$$
$$d = \frac{(K \cdot h2 \cdot L + h3)}{(1 + K^2)}$$

In this way, it is possible to extract the channel response element c of the original channel matrix from which the error of the estimated value due to the phase error has been removed. Here, H represents the original channel matrix and Hα represents the channel matrix including the phase error component. The other channel response elements a, b, and d can be extracted in the same way.

According to the above-mentioned procedure, when the channel estimation result is prepared and used before the decoding result of the encoded and transmitted information symbols is acquired, it is possible to prevent the deterioration in channel-estimating precision from being accumulated by removing the frequency offset or the estimated error component included in the estimated channel value after acquiring the decoding result of the encoded and transmitted information symbols.

Hitherto, the method of removing the influence of the phase error component when the known information symbols HT-LTF from the transmitting antennas of the transmitter are orthogonalized, arranged, and transmitted has been described, which is an embodiment of the invention. That is, when the channel matrix is divided into the channel response elements for use, the waveform equalizing unit 106 removes the interference component based on the neighboring known information symbols in the signals received by the same receiving antenna using the phase error estimated by the phase error estimating unit 112 on the basis of the decoding result of the encoded and transmitted information symbols in the preamble of the received packet.

Expression 7 is an expression applied to the communication system including two transmitting antennas and two receiving antennas. However, when the communication system is extended to N transmitting antennas and M receiving antennas (where N and M are derivative integers and at least one of N and M is 3 or more), Expression 7 can be similarly extended and the phase error of the transmission symbols can be sequentially corrected. As shown in FIG. 6, it should be noted that the correction angle $e^{j\Theta}$ is accumulated.

Subsequently, the method of removing the influence of the phase error component when the known information symbols are time-divisionally transmitted from the transmitting antennas of the transmitter will be described. In this case, for example, the waveform equalizing unit 106 can remove the phase error component of the subsequent known information symbols in the signals received by the same receiving antenna using the phase error estimated by the phase error estimating unit 112 on the basis of the decoding result of the encoded and transmitted information symbols L-SIG and HT-SIG. This method is an embodiment of the invention and can be expressed by Expression 8, whereby it is easy to correct the channel matrix.

Expression 8

$$H = \begin{bmatrix} a & c \\ b & d \end{bmatrix}, \quad (8)$$

$$H_\alpha = \begin{bmatrix} h0 & h1 \\ h2 & h3 \end{bmatrix}$$

$$= \begin{bmatrix} A_{00} \cdot e^{j(\theta_{00})} & A_{01} \cdot e^{j(\theta_{01}+\Delta)} \\ A_{10} \cdot e^{j(\theta_{10})} & A_{11} \cdot e^{j(\theta_{11}+\Delta)} \end{bmatrix}$$

$$= H \cdot K = \begin{bmatrix} a & c \\ b & d \end{bmatrix} \begin{bmatrix} 1.0 \\ e^{j\theta} \end{bmatrix},$$

$$K = \begin{bmatrix} 1.0 \\ e^{j\theta} \end{bmatrix},$$

$$a = h0, b = h2,$$
$$c = h1/e^{j\theta}, d = h3/e^{j\theta}$$

Expression 8 is an expression applied to the communication system including two transmitting antennas and two receiving antennas. However, when the communication system is extended to N transmitting antennas and M receiving antennas, Expression 8 can be similarly extended and the phase mismatch between the transmission symbols can be sequentially corrected after the second row of the channel matrix. As shown in FIG. 6, it should be noted that the correction angle $e^{j\Theta}$ is accumulated.

Subsequently, the method of removing the influence of the phase error component when the known information symbols are divided into plural sub carriers in the frequency axis and transmitted from the transmitting antennas of the transmitter will be described. Only when the frequency multiplex transmission system such as the OFDM is used, the method depends on what symbols the known information symbols corresponding to the sub carriers are sent. In this case, for example, the waveform equalizing unit 106 can remove the phase error component of the sub carriers included in the subsequent known information symbols in the signals received by the same receiving antenna using the phase error estimated by the phase error estimating unit 112 on the basis of the decoding result of the encoded and transmitted information symbols L-SIG and HT-SIG. This method is an embodiment of the invention and can be expressed by Expression 9.

Expression 9

$$H_i = \begin{bmatrix} a_i & c_i \\ b_i & d_i \end{bmatrix}, \quad (9)$$

$$H_\alpha = \begin{bmatrix} h0_i & h1_i \\ h2_i & h3_i \end{bmatrix}$$

$$= \begin{bmatrix} A_{00,i} \cdot e^{j(\theta_{00,i} + X_i \cdot \Delta_i)} & A_{01,i} \cdot e^{j(\theta_{01,i} + X_i \cdot \Delta_i)} \\ A_{10,i} \cdot e^{j(\theta_{10,i} + X_i \cdot \Delta_i)} & A_{11,i} \cdot e^{j(\theta_{11,i} + X_i \cdot \Delta_i)} \end{bmatrix}$$

$$= H_i \cdot e^{j \cdot X_i \cdot \Delta_i},$$

$$a_i = h0_i / e^{j \cdot X_i \cdot \Delta_i}, \, b_i = h2_i / e^{j \cdot X_i \cdot \Delta_i},$$

$$c_i = h1_i / e^{j \cdot X_i \cdot \Delta_i}, \, d_i = h3_i / e^{j \cdot X_i \cdot \Delta_i}$$

In Expression 9, i represents a value corresponding to a serial number of a sub carrier in the information symbols and $X_i$ represents a value corresponding to (the serial number of the symbol as which the i-th sub carrier is sent −1). (Here, the symbol represents a section on which the receiving FFT process is performed.)

Expression 9 is an expression applied to the communication system including two transmitting antennas and two receiving antennas and transmitting two streams. However, when the communication system is extended to N transmitting antennas and M receiving antennas, Expression 9 can be similarly extended and the phase mismatch between the transmission symbols can be corrected. As shown in FIG. 6, it should be noted that the correction angle $e^{j\theta}$ is accumulated.

Figure 7:
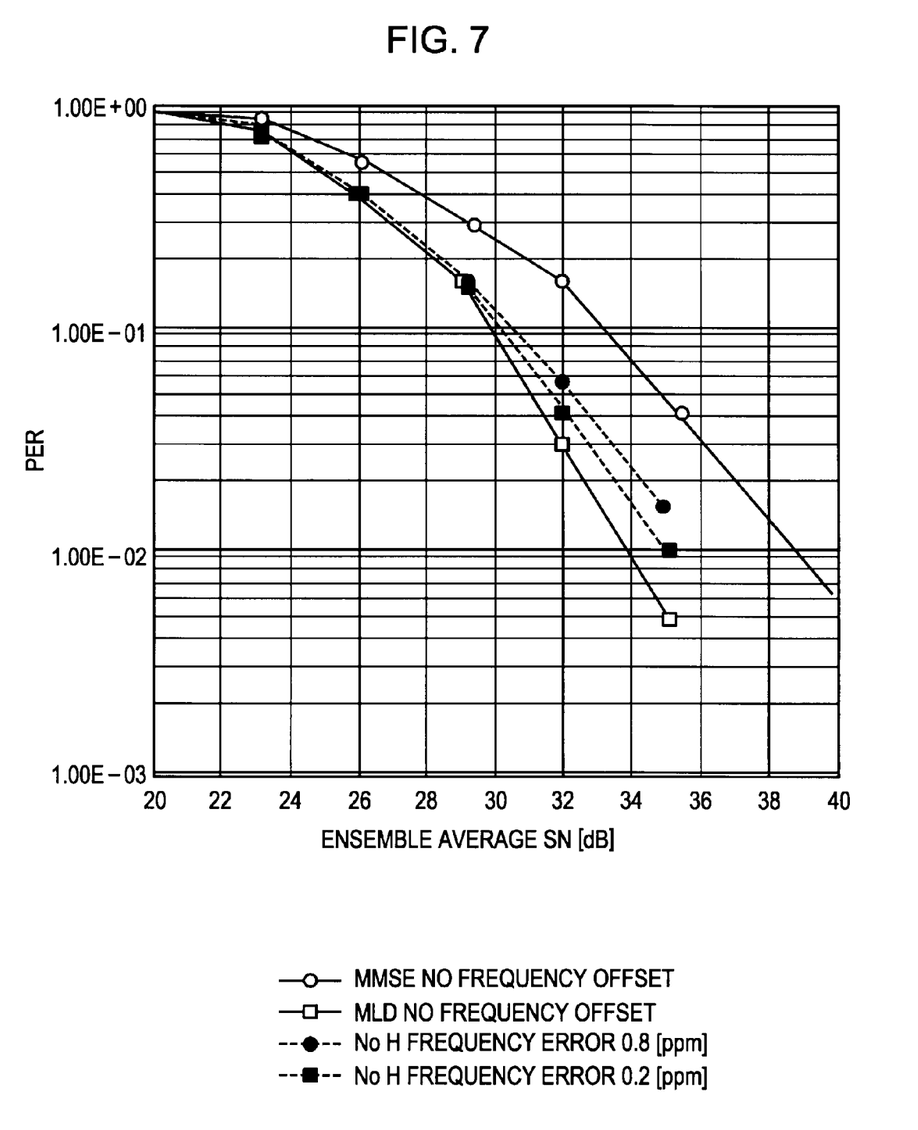
FIG. 7 is a diagram illustrating the simulation result in which an error component included in Expression 3 is removed.

Finally, the simulation result in which the error component included in Expression 3 is removed is shown in FIG. 7. It can be understood from the shown result that the resistance of the demodulation of the data symbol portion of the received packet to the frequency error is improved by removing the channel estimation error due to the frequency offset.

The present application contains subject matter related to that disclosed in Japanese Priority Patent Application JP 2008-281386 filed in the Japan Patent Office on Oct. 31, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication device for performing a receiving operation in a wireless communication system including at least one antenna, comprising:
 a channel matrix correcting unit that estimates a channel matrix including channel response elements between antennas;
 a phase error estimating unit estimating a phase error resulting from a phase noise, a clock drift, and a frequency offset included in a received signal on the basis of a decoding result of encoded and transmitted information symbols in a preamble of a received packet; and
 a waveform equalizing unit equalizing a waveform of data symbols of the received packet using the channel matrix, wherein original channel response elements are derived by removing an error of an estimated channel value due to the phase error estimated by the phase error estimating unit from the channel response elements of the channel matrix supplied from the channel matrix correcting unit, and the waveform equalizing unit equalizes the waveform of the data symbols using the channel matrix including the original channel response elements.

2. The wireless communication device according to claim 1, further comprising:
 a channel matrix acquiring unit acquiring a first channel matrix using known information symbols included in the preamble of the received packet;
 a modulation unit modulating the decoding result of the encoded and transmitted information symbols in the preamble of the received packet and generating replicas of transmission symbols; and
 a channel updating unit processing an error component of a fading variation component of the first channel matrix using the replicas of the transmission symbols, the received symbols, and the first channel matrix acquired by the channel matrix acquiring unit and updating the first channel matrix to a second channel matrix,
 wherein the channel matrix correcting unit determines the channel matrix to be supplied to the waveform equalizing unit on the basis of the first and second channel matrixes.

3. The wireless communication device according to claim 1, further comprising a modulation unit modulating the decoding result of the encoded and transmitted information symbols in the preamble of the received packet and generating replicas of transmission symbols,
 wherein the phase error estimating unit estimates the phase error using the replicas of the transmission symbols, the received symbols, and the channel matrix.

4. The wireless communication device according to claim 1, wherein when the channel matrix correcting unit prepares and uses a channel matrix estimation result before acquiring the decoding result of the encoded and transmitted information symbols in the preamble of the received packet, the waveform equalizing unit removes a phase error component estimated by the phase error estimating unit from the channel matrix estimated by the channel matrix correcting unit after acquiring the decoding result of the encoded and transmitted information symbols in the preamble of the received packet.

5. The wireless communication device according to claim 4, wherein known information symbols are orthogonalized, arranged, and transmitted from an antenna, and
 wherein when the channel matrix is divided into the channel response elements for use, the waveform equalizing unit removes an interference component based on neighboring known information symbols in the signals received by a same antenna using the phase error estimated by the phase error estimating unit on the basis of the decoding result of the encoded and transmitted information symbols in the preamble of the received packet.

6. The wireless communication device according to claim 4, wherein known information symbols are time-divisionally transmitted from an antenna, and
 wherein the waveform equalizing unit removes the phase error component of subsequent known information symbols in the signals received by a same antenna using the phase error estimated by the phase error estimating unit on the basis of the decoding result of the encoded and transmitted information symbols in the preamble of the received packet.

7. The wireless communication device according to claim 4, wherein known information symbols are frequency-divided into a plurality of sub carriers in a frequency axis and transmitted from an antenna, and the phase error component of the sub carriers included in subsequent known information symbols is removed in the signals received by a same antenna using the phase error estimated by the phase error estimating unit on the basis of the decoding result of the encoded and transmitted information symbols in the preamble of the received packet.

8. The wireless communication device according to claim 1, wherein a transmission format in which known information symbols used for the channel matrix correcting unit to estimate the channel matrix are arranged before the encoded and transmitted information symbols in the preamble of the packet is applied, and
wherein the phase error estimating unit estimates a phase error component on the basis of the decoding result of the encoded and transmitted information symbols after the channel matrix correcting unit estimates the channel matrix including the error component, and the waveform equalizing unit equalizes the waveform of the symbols after removing the phase error component from the channel response elements of the channel matrix.

9. The wireless communication device according to claim 1, wherein the phase error estimating unit averages the phase errors estimated over several symbols.

10. A wireless communication method of performing a receiving operation in a wireless communication system including at least one antenna, comprising the steps of:
estimating a channel matrix including channel response elements between antennas;
estimating a phase error resulting from a phase noise, a clock drift, and a frequency offset included in a received signal on the basis of a decoding result of encoded and transmitted information symbols in a preamble of a received packet;
deriving original channel response elements by removing an error of an estimated channel value due to the estimated phase error from the channel response elements of the estimated channel matrix; and
equalizing a waveform of data symbols using the channel matrix including the original channel response elements.

11. A signal processing device for processing a received signal in a wireless communication system including at least one antenna, comprising:
a channel matrix correcting unit that estimates a channel matrix including channel response elements between antennas;
a phase error estimating unit estimating a phase error resulting from a phase noise, a clock drift, and a frequency offset included in a received signal on the basis of a decoding result of encoded and transmitted information symbols in a preamble of a received packet; and
a channel estimating precision improving unit deriving original channel response elements by removing an error of an estimated channel value due to the phase error estimated by the phase error estimating unit from the channel response elements of the channel matrix supplied from the channel matrix correcting unit.

12. A signal processing method of processing a received signal in a wireless communication system including at least one antenna, comprising the steps of:
estimating a channel matrix including channel response elements between antennas;
estimating a phase error resulting from a phase noise, a clock drift, and a frequency offset included in a received signal on the basis of a decoding result of encoded and transmitted information symbols in a preamble of a received packet; and
deriving original channel response elements by removing an error of an estimated channel value due to the estimated phase error from the channel response elements of the estimated channel matrix.

13. A non-transitory computer-readable medium having stored thereon a computer program causing a computer to carry out a process of allowing a wireless communication device to perform a receiving operation in a wireless communication system including at least one antenna, the computer program causing the computer to serve as:
a channel matrix correcting unit that estimates a channel matrix including channel response elements between antennas;
a phase error estimating unit estimating a phase error resulting from a phase noise, a clock drift, and a frequency offset included in a received signal on the basis of a decoding result of encoded and transmitted information symbols in a preamble of a received packet; and
a waveform equalizing unit equalizing a waveform of data symbols of the received packet using the channel matrix,
wherein original channel response elements are derived by removing an error of an estimated channel value due to the phase error estimated by the phase error estimating unit from the channel response elements of the channel matrix supplied from the channel matrix correcting unit, and the waveform equalizing unit equalizes the waveform of the data symbols using the channel matrix including the original channel response elements.

* * * * *